United States Patent
Zheng et al.

(10) Patent No.: US 11,928,450 B2
(45) Date of Patent: Mar. 12, 2024

(54) MOBILE TERMINAL, METHOD FOR UNINSTALLING PRE-INSTALLED APPLICATION THEREIN, AND MEMORY

(71) Applicant: HuiZhou TCL Mobile Communication Co., Ltd., Guangdong (CN)

(72) Inventors: Jinguo Zheng, Guangdong (CN); Yanxiang Zhang, Guangdong (CN)

(73) Assignee: HuiZhou TCL Mobile Communication Co., Ltd., HuiZhou (CN)

( * ) Notice: Subject to any disclaimer, the term of this patent is extended or adjusted under 35 U.S.C. 154(b) by 257 days.

(21) Appl. No.: 17/417,930

(22) PCT Filed: Nov. 19, 2019

(86) PCT No.: PCT/CN2019/119461
§ 371 (c)(1),
(2) Date: Jun. 24, 2021

(87) PCT Pub. No.: WO2020/134719
PCT Pub. Date: Jul. 2, 2020

(65) Prior Publication Data
US 2022/0091833 A1    Mar. 24, 2022

(30) Foreign Application Priority Data
Dec. 26, 2018    (CN) .......................... 201811600320.5

(51) Int. Cl.
*G06F 8/61*    (2018.01)
*H04L 67/00*    (2022.01)

(52) U.S. Cl.
CPC ................ *G06F 8/62* (2013.01); *H04L 67/34* (2013.01)

(58) Field of Classification Search
CPC .................................. G06F 8/62; H04L 67/34
(Continued)

(56) References Cited

U.S. PATENT DOCUMENTS 8,874,703 B1 * 10/2014 Worsley ................. H04L 67/34
    709/221
9,471,297 B2   10/2016 Hogan et al.
(Continued)

FOREIGN PATENT DOCUMENTS

CN    102521031    6/2012
CN    104023032    9/2014
(Continued)

OTHER PUBLICATIONS

Supplementary European Search Report and the European Search Opinion dated Sep. 6, 2022 From the European Patent Office Re. Application No. 19902405.0. (14 Pages).
(Continued)

*Primary Examiner* — Wei Y Zhen
*Assistant Examiner* — Mohammed N Huda (57) ABSTRACT

The present application provides a mobile terminal, a method for uninstalling a pre-installed application therein, and a memory. The method comprises the following steps: obtaining an authorization file for uninstalling a pre-installed application; determining whether the authorization file is valid; if so, determining whether the pre-installed application is a user-level application; and if so, uninstalling the pre-installed application.

13 Claims, 3 Drawing Sheets

(58) Field of Classification Search
USPC .......................................................... 717/174
See application file for complete search history.

(56) References Cited

U.S. PATENT DOCUMENTS

| | | | |
|---|---|---|---|
| 2004/0003266 A1* | 1/2004 | Moshir et al. ............ | G06F 8/62 |
| | | | 717/174 |
| 2009/0300596 A1* | 12/2009 | Tyhurst et al. ........... | G06F 8/65 |
| | | | 717/171 |
| 2014/0040873 A1 | 2/2014 | Goldman | |
| 2014/0245286 A1 | 8/2014 | Wong et al. | |
| 2017/0262273 A1* | 9/2017 | Xu et al. .................. | G06F 8/62 |
| 2019/0171430 A1 | 6/2019 | Xu et al. | |

FOREIGN PATENT DOCUMENTS

| | | |
|---|---|---|
| CN | 104199697 | 12/2014 |
| CN | 104239041 | 12/2014 |
| CN | 105094279 | 11/2015 |
| CN | 105094279 | 9/2018 |
| CN | 105138226 | 9/2018 |
| CN | 109739519 | 5/2019 |

OTHER PUBLICATIONS

Elenkov "Android Security Internals: An In-Depth Guide to Android's Security Architecture": 434P., Oct. 2014.

* cited by examiner

MOBILE TERMINAL, METHOD FOR UNINSTALLING PRE-INSTALLED APPLICATION THEREIN, AND MEMORY

RELATED APPLICATIONS

This application is a National Phase of PCT Patent Application No. PCT/CN2019/119461 having International filing date of Nov. 19, 2019, which claims the benefit of priority of Chinese Patent Application No. 201811600320.5 filed on Dec. 26, 2018. The contents of the above applications are all incorporated by reference as if fully set forth herein in their entirety.

FIELD AND BACKGROUND OF THE INVENTION

The present application relates to mobile terminal technologies, and more particularly to a mobile terminal, a method for uninstalling a pre-installed application thereof, and a memory.

Currently, mobile phones on the market will be pre-installed with many applications, including manufacturers' self-developed applications and third-party applications. By this way, promotion of applications is achieved and revenue is got. It is generally not allowed for the users to uninstall the pre-installed applications. However, for the users, the more applications that are pre-installed, the more processes that may be started and more memory that may be consumed. For limited resources the mobile phone has, it is more likely to cause performance issues and lags, and more services run in background. It will also increase the power consumption of the mobile phone. In addition, it will make the mobile phone desktop messier. Hence, pre-installing too many applications will have a great impact on user experience of the mobile phone. Since all the pre-installed applications cannot be uninstalled, if the users want to obtain this permission, the mobile phones must be rooted. However, there is a high risk in rooting the phone. Unsuccessful rooting may cause the phone to be unusable, and successful rooting will reduce security of the phone, making it easier to be invaded and destroyed.

SUMMARY OF THE INVENTION

The present application provides a mobile terminal, a method for uninstalling a pre-installed application thereof, and a memory, which are capable of improving the performance of the mobile terminal.

In a first aspect, the present application provides a method for uninstalling a pre-installed application in a mobile terminal, including the steps of:
  obtaining an authorization file for uninstalling the pre-installed application;
  determining whether the authorization file is valid;
  if the authorization file is valid, determining whether the pre-installed application is a user-level application; and
  if the pre-installed application is the user-level application, uninstalling the pre-installed application.

In a second aspect, the present application further provides a memory, storing a computer program that is executable to implement the afore-mentioned uninstalling method.

In a third aspect, the present application provides a mobile terminal, including a processor and a memory communicating with the processor, the memory storing a computer program that is configured to be executed to implement the afore-mentioned uninstalling method, the processor configured to call the computer program in the memory to implement the afore-mentioned uninstalling method.

The performance of the mobile terminal and user experience are improved as well as a risk of directly rooting the phone is avoided.

BRIEF DESCRIPTION OF THE SEVERAL VIEWS OF THE DRAWINGS

The technical solutions and other beneficial effects of the present application will be more apparent with reference to the detailed descriptions of the embodiments of the present application below in accompanying with the drawings.

DESCRIPTION OF SPECIFIC EMBODIMENTS OF THE INVENTION

Embodiments of the present application will be described in detail herein with reference to the drawings. However, the present application may be embodied in many different forms and the present application is not intended to be construed as being limited to the specific embodiments set forth herein. Conversely, the embodiments of the present application are provided to explain the principles and practical applications of the present application so that those skilled in the art can understand various embodiments of the present application and various modifications suitable for particular intended applications. In the appending figures, elements with same structures are always indicated by same reference numbers.

The method for uninstalling a pre-installed application in a mobile terminal in the present embodiment may be applied to Android system and may also be applied to IOS system. The mobile terminal may be a mobile electronic device such as a cell phone, a tablet, a smart watch and so on.

Figure 1:
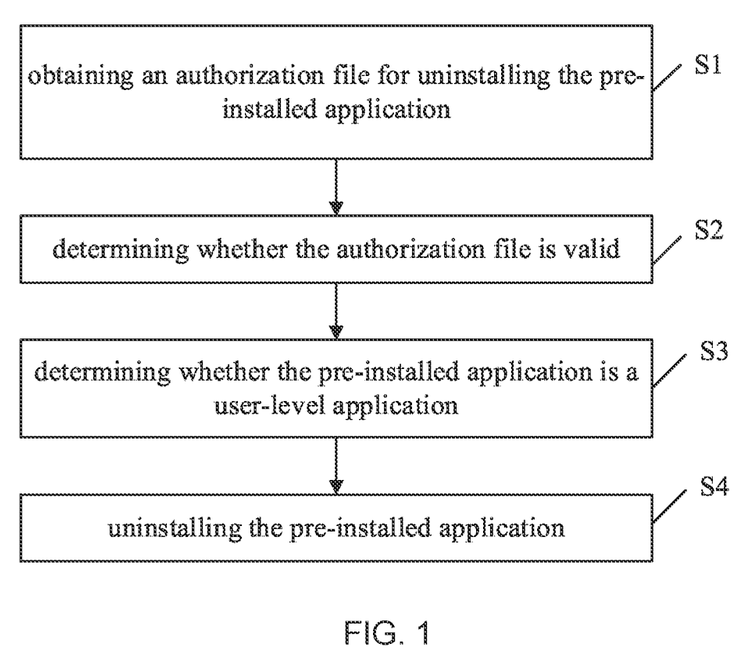
FIG. 1 is a flowchart of a method for uninstalling a pre-installed application in a mobile terminal.

Referring to FIG. 1, the method for uninstalling the pre-installed application in the mobile terminal provided in the present embodiment includes the following steps.

S1: obtaining an authorization file for uninstalling the pre-installed application;

S2: determining whether the authorization file is valid, and going to Step S3 if the authorization file is valid;

S3: determining whether the pre-installed application is a user-level application, and if the pre-installed application is the user-level application, going to Step S4;

S4: uninstalling the pre-installed application.

In the present embodiment, the pre-installed applications include system-level applications and user-level applications. The system-level applications are indispensable applications for the mobile terminal. If they are deleted, it will cause the mobile terminal unable to be used normally. The user-level applications are applications that can be deleted, and after they are deleted, it will not affect a normal use of the mobile terminal. The user-level applications include applications developed by mobile terminal manufacturers themselves and third-party applications.

Obtaining permission to uninstall the pre-installed application by a valid authorization file may avoid malicious theft of the authorized file. By determining whether the pre-installed application is a user-level application, it can be avoided that the mobile terminal cannot be used, caused when a user accidentally deletes system-level applications. This allows the user to customize pre-installed applications based on its needs, improves the performance of the mobile terminal and user experience, and avoids a risk of directly rooting the phone.

In Step S1, the authorization file is generated by a server, the mobile terminal sends configuration parameters to the server, and the server generates the authorization file according to the configuration parameters of the mobile terminal. The authorization file includes a configuration file and a signature file. Specifically, Step S1 includes:

S11: obtaining configuration parameters of the mobile terminal;
S12: generating the configuration file based on the configuration parameters;
S13: obtaining abstract information of the configuration file;
S14: encrypting the abstract information of the configuration file to obtain the signature file.

In Step S11, the configuration parameters of the mobile terminal include International Mobile Equipment Identity (IMEI), Serial Number (SN) and model number of the mobile terminal. Of course, the configuration parameters of the mobile terminal may also include other parameters that can be used to identify the mobile terminal, and are not limited to IMEI, SN, and model number.

In Step S12, the configuration file is generated based on the configuration parameters. The format of the configuration file is xml for easy of being analyzed by Android phones. The configuration file is used to record the configuration parameters of the mobile terminal.

In Step S13, Message-Digest Algorithm 5 (MD5) is adopted to obtain the abstract information of the configuration file. The MD5 algorithm is a hash function widely used in computer security technologies and is used to provide protection of integrity of messages. It is not repeated here.

In Step S14, the abstract information of the configuration file obtained in Step S13 is encrypted by the server using a private key to obtain the signature file. Since the private key is stored in the server, it is not easy to leak the private key such that the signature file impossible to be imitated. In the present embodiment, the abstract information of the configuration file is encrypted using a private key of RSA asymmetric encryption algorithm. Of course, in the present embodiment, the abstract information may also be encrypted using a private key used in other encryption algorithms. It is not limited herein.

Android phones are taken as an example to describe the process of generating the authorization file by the server. First, Android phone sends its configuration parameters (IMEI, SN and model number) to the server. The server generates a configuration file removable_cfg.xml based on the configuration parameters, obtains abstract information of the configuration file removable_cfg.xml by MD5 algorithm, and then uses a private key of RSA asymmetric encryption algorithm to encrypt the abstract information of the configuration file removable_cfg.xml to obtain a signature file removable_cert, thereby obtaining the authorization file including the configuration file removable_cfg.xml and the signature file removable_cert. The server sends the authorization file to the Android phone, and the Android phone automatically downloads the authorization file.

Figure 2:
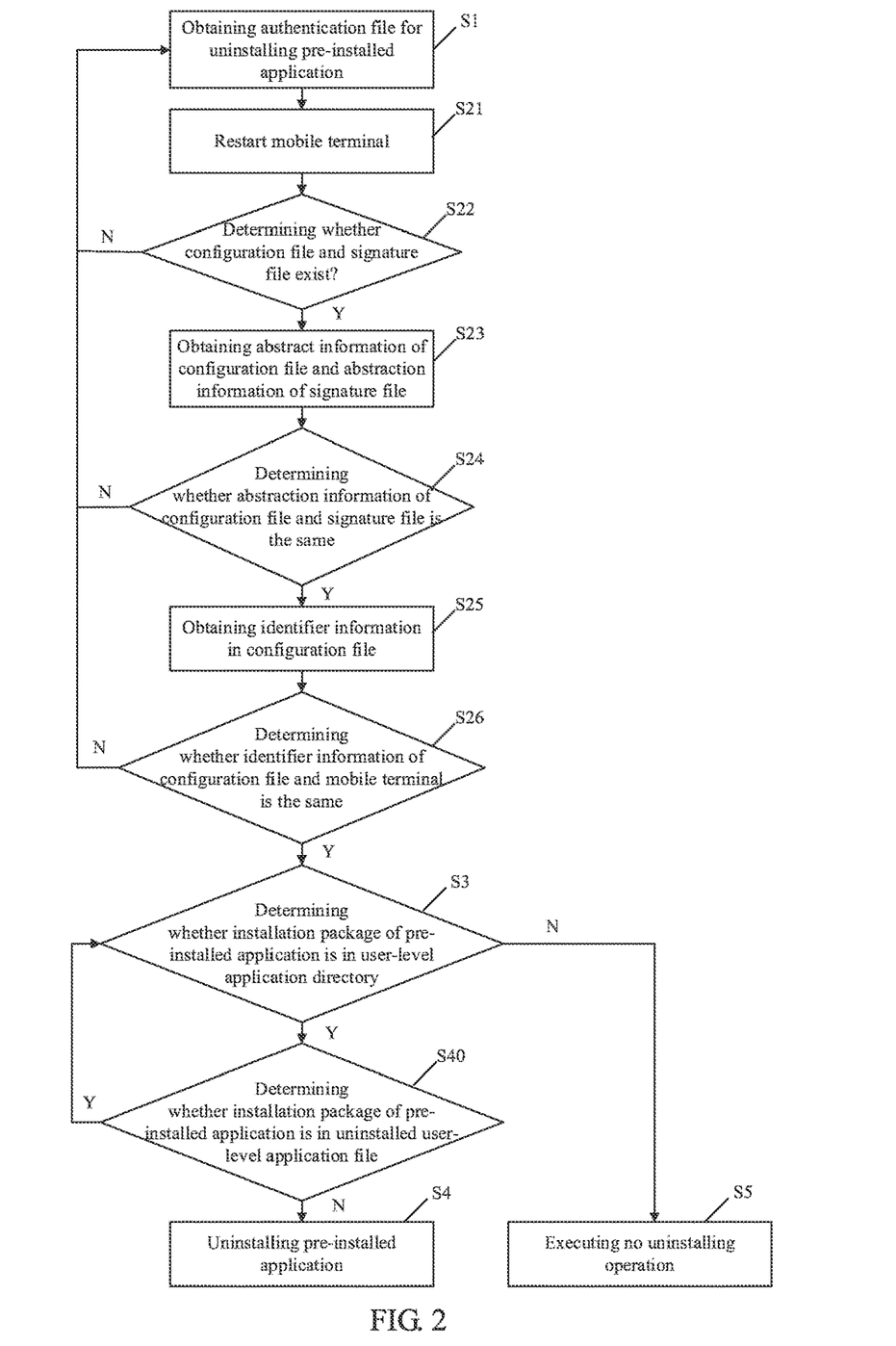
FIG. 2 is another flowchart of a method for uninstalling a pre-installed application in a mobile terminal.

Referring to FIG. 2, in Step S2, since the permission to uninstall the pre-installed application can only be processed during a startup phase, the mobile terminal needs to be restarted to uninstall the pre-installed application after obtaining the authorization file. Specifically, Step S2 includes:

S21: restarting the mobile terminal;
S22: determining whether the configuration file and the signature file exist, and going to Step S23 if the configuration file and the signature file exist;
S23: obtaining the abstract information of the configuration file, and decrypting the signature file to obtain the abstract information of the signature file;
S24: determining whether the abstract information of the configuration file is the same as the abstract information of the signature file, and going to Step S25 if the abstract information of the configuration file is the same as the abstract information of the signature file;
S25: obtaining identifier information of the configuration file;
S26: determining whether the identifier information of the configuration file is the same as the identifier information of the mobile terminal, and if the identifier information of the configuration file is the same as the identifier information of the mobile terminal, determining that the authorization file is valid and going to Step S3.

In Step S22, the purpose of determining whether the configuration file and the signature file exist is to determine whether the mobile terminal successfully receives the authorization file. The pre-installed application can be uninstalled only when the mobile terminal successfully receives the authorization file.

In Step S22, if the configuration file or the signature file does not exist, the authorization file is invalid, and the process returns to Step S1 to obtain the authorization file for uninstalling the pre-installed application again. The absence of the configuration file or the signature file includes a case where the configuration file exists and the signature file does not exist, a case where the configuration file does not exist and the signature file exists, and a case where neither the configuration file nor the signature file exists.

In Step S23, the mobile terminal uses MD5 algorithm to obtain the abstract information of the configuration file and decrypts the abstract information of the signature file by using a public key to obtain the abstract information of the signature file. The public key of the mobile terminal corresponds to the private key in the server.

In Step S24, it can be known whether the configuration file has been maliciously tampered with by determining whether the abstract information of the configuration file is the same as the abstract information of the signature file. When the abstract information of the configuration file is the same as the abstract information of the signature file, it indicates that the configuration file has not been maliciously tampered with. When the abstract information of the configuration file is different from the abstract information of the signature file, it indicates that the configuration file has been maliciously tampered with, the authorization file is invalid, and go to Step S1 to re-obtain the authorization file for uninstalling the preset application.

In Step S25, it can be known a mobile terminal corresponding to the authorization file by obtaining the identifier information of the configuration file. The identifier information includes IMEI or model number, and it can be known a corresponding mobile terminal by using IMEI or model number.

In Step S26, it can be known whether the authorization file is the authorization file of the mobile terminal by determining whether the identifier information in the configuration file is the same as the identifier information of the mobile terminal. When the identifier information in the configuration file is the same as the identifier information of the mobile terminal, the authorization file is valid, and go to Step S3, that is, the authorization file is the authorization file of the mobile terminal. When the identifier information in the configuration file is not the same as the identifier information of the mobile terminal, the authorization file is invalid, and go to Step S1 to re-obtain the authorization file for uninstalling the pre-installed application. For the identifier information in the configuration file different from the identifier information of the mobile terminal. this indicates that the authorization file is not the authorization file of the mobile terminal, thereby preventing the authorization file from being applied to other mobile terminals.

Android phones are taken as an example to describe the process of determining whether the authorization file is valid. First, Android phone determines whether the configuration file removable_cfg.xml and the signature file removable_cert exist. If the configuration file removable_cfg.xml and the signature file removable_cert exist, MD5 algorithm is used to obtain the abstract information h1 of the configuration file removable_cfg.xml, and then a public key of the Android phone is used to decrypt the signature file removable_cert to obtain the abstract information h2 of the signature file removable_cert. It is then determined whether h1 and h2 are the same. If h1 and h2 are the same, it is to obtain the identifier information (IMEI or model number) of the configuration file removable_cfg.xml, and determine whether the identifier information of the configuration file removable_cfg.xml is the same as the identifier information (IMEI or model number) of the mobile terminal. If so, go to Step S3; if not, go to Step S1.

In order to allow the user to be intuitively aware of an authorization status of the mobile terminal, after Step S26, the uninstalling method in the present embodiment further includes displaying authorization information. That is, if the authorization file is valid, it will display "authorized"; if the authorization file is invalid, it will display "unauthorized".

In the present embodiment, before obtaining the authorization file for uninstalling the pre-installed application program, that is, before Step S1, a user-level application directory is added to a storage space of the mobile terminal, and an installation package of the user-level application of the mobile terminal is stored in the user-level application directory.

Taking Android phones as an example, the user-level application directory /system/custpack/app/custRemoveable is added to the storage space of the Android phone, and the installation package of the user-level application of the Android phone is stored in /system/custpack/app/custRemoveable.

In Step S3, when the authorization file is valid, it also needs to determine whether the pre-installed application is a user-level application. Since all user-level applications are stored in the user-level application directory, it can be known whether the pre-installed application is a user-level application by determining whether the pre-installed application is in the user-level application directory.

Specifically, Step S3 includes:
scanning the user-level application directory and determining whether the installation package of the pre-installed application is in the user-level application directory, and determining that the pre-installed application is the user-level application if the installation package of the pre-installed application is in the user-level application directory, and going to Step S4.

In Step S3, if the installation package of the pre-installed application is not in the user-level application directory, the uninstalling method in the present embodiment further includes:

S5: executing no uninstalling operation. That is, if the installation package of the pre-installed application is not in the user-level application directory, the pre-installed application is a system-level application, and the uninstalling operation is not executed, that is, the pre-installed application cannot be uninstalled.

Take Android phones as an example, it is to scan /system/custpack/app/custRemoveable and determine whether the installation package of the pre-installed application is in /system/custpack/app/custRemoveable directory. If the installation package of the pre-installed application is in /system/custpack/app/custRemoveable, the pre-installed application is a user-level application, and go to Step S4. If the installation package of the pre-installed application is not in /system/custpack/app/custRemoveable, the pre-installed application is a system-level application, and go to Step S5.

Since the installation packages of the mobile terminal are all stored in a system partition of the mobile terminal, the installation packages in the system partition cannot be deleted. That is, the user-level application directory is located in the system partition, and the installation packages of the applications in the user-level application directory cannot be deleted. In the present embodiment, uninstalling the pre-installed application is only to delete the application data in user space, and the installation package in the user-level application directory is not deleted. Hence, after each time the mobile terminal restarts, even though the pre-installed application has been uninstalled, the installation package of the pre-installed application that has been uninstalled can still be found when scanning the user-level application directory.

In the present embodiment, after uninstalling the pre-installed application, that is, after Step S4, the installation package of the pre-installed application that has been uninstalled is archived in an uninstalled user-level application file. Taking Android phones as an example, an uninstalled user-level application file uninstallList is added to the Android phone, and the installation package of the pre-installed application that has been uninstalled is archived in the uninstalled user-level application file uninstallList.

In order to filter the user-level application directory for the pre-installed application that has been uninstalled, before uninstalling the pre-installed applications, that is, before Step S4, the uninstalling method further includes:

S40: determining whether the installation package of the pre-installed application is in the uninstalled user-level application file, and going to Step S4 if the installation package of the pre-installed application is not in the uninstalled user-level application file. If the installation package of the pre-installed application is in the uninstalled user-level application file, return to Step S3 to perform an uninstalling operation on a next pre-installed application.

Above all, in the method for uninstalling the pre-installed application in the mobile terminal provided in the present invention, by obtaining an authorization file for uninstalling the pre-installed application, determining whether the authorization file is valid, and uninstalling the pre-installed application if the authorization file is valid and the pre-installed application is the user-level application, the users can customize pre-installed applications based on their own needs, thereby improving the performance of the mobile terminal and user experience, and avoiding a risk of directly rooting the phone.

Figure 3:
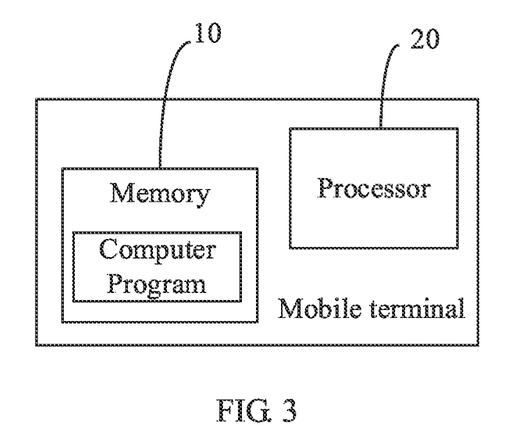
FIG. 3 is a structural schematic diagram of a mobile terminal.

Referring to FIG. 3, the present embodiment further provides a mobile terminal, which includes a memory 10 and a processor 20. The memory 10 communicates with the processor 20. In an embodiment of the present application, the memory 10 stores a computer program, which is configured to be executed to implement the following method steps:

obtaining an authorization file for uninstalling the pre-installed application;

determining whether the authorization file is valid;

if the authorization file is valid, determining whether the pre-installed application is a user-level application; and if the pre-installed application is the user-level application, uninstalling the pre-installed application.

In some embodiments, the authorization file includes a configuration file and a signature file, and in obtaining the authorization file for uninstalling the pre-installed application, the computer program is executed to implement the steps of:

obtaining configuration parameters of the mobile terminal;

generating the configuration file based on the configuration parameters;

obtaining abstract information of the configuration file; and encrypting the abstract information of the configuration file to obtain the signature file.

In some embodiments, the configuration parameters at least include International Mobile Equipment Identity (IMEI), Serial Number (SN) and model number of the mobile terminal.

In some embodiments, in determining whether the authorization file is valid, the computer program is executed to implement the steps of:

restarting the mobile terminal;

determining whether the configuration file and the signature file exist;

if the configuration file and the signature file exist, obtaining the abstract information of the configuration file and decrypting the signature file to obtain the abstract information of the signature file;

determining whether the abstract information of the configuration file is the same as the abstract information of the signature file;

if the abstract information of the configuration file is the same as the abstract information of the signature file, obtaining identifier information of the configuration file;

determining whether the identifier information of the configuration file is the same as the identifier information of the mobile terminal; and if the identifier information of the configuration file is the same as the identifier information of the mobile terminal, determining that the authorization file is valid.

In some embodiments, before obtaining the authorization file for uninstalling the pre-installed application, the computer program is executed to implement the step of:

adding a user-level application directory in a storage space of the mobile terminal, and storing an installation package of the pre-installed application of the mobile terminal in the user-level application directory.

In some embodiments, in determining whether the pre-installed application is the user-level application if the authorization file is valid, the computer program is executed to implement the steps of:

if the authorization file is valid, scanning the user-level application directory and determining whether the installation package of the pre-installed application is in the user-level application directory; and if the installation package of the pre-installed application is in the user-level application directory, determining that the pre-installed application is the user-level application.

In some embodiments, after the pre-installed application is uninstalled, the computer program is executed to implement the step of:

archiving the installation package of the pre-installed application to an uninstalled user-level application file.

In some embodiments, before the pre-installed application is uninstalled, the computer program is executed to implement the step of:

determining whether the installation package of the pre-installed application is in the uninstalled user-level application file; and if the installation package of the pre-installed application is not in the uninstalled user-level application file, uninstalling the pre-installed application.

In an embodiment of the present application, the processor 20 of the mobile terminal is configured to call the computer program in the memory to implement the following method steps:

adding a user-level application directory in a storage space of the mobile terminal, and storing an installation package of the pre-installed application of the mobile terminal in the user-level application directory;

obtaining an authorization file for uninstalling the pre-installed application, wherein the authorization file includes a configuration file and a signature file;

determining whether the authorization file is valid;

if the authorization file is valid, determining whether the pre-installed application is a user-level application; and if the pre-installed application is the user-level application, uninstalling the pre-installed application.

In some embodiments, in obtaining the authorization file for uninstalling the pre-installed application, the processor 20 calls the computer program to implement the steps of:

obtaining configuration parameters of the mobile terminal;

generating the configuration file based on the configuration parameters;

obtaining abstract information of the configuration file; and encrypting the abstract information of the configuration file to obtain the signature file.

In some embodiments, the configuration parameters at least include International Mobile Equipment Identity (IMEI), Serial Number (SN) and model number of the mobile terminal.

In some embodiments, in determining whether the authorization file is valid, the processor 20 calls the computer program to implement the steps of:

restarting the mobile terminal;

determining whether the configuration file and the signature file exist;

if the configuration file and the signature file exist, obtaining the abstract information of the configuration file and decrypting the signature file to obtain the abstract information of the signature file;

determining whether the abstract information of the configuration file is the same as the abstract information of the signature file;

if the abstract information of the configuration file is the same as the abstract information of the signature file, obtaining identifier information of the configuration file;

determining whether the identifier information of the configuration file is the same as the identifier information of the mobile terminal; and if the identifier information of the configuration file is the same as the identifier information of the mobile terminal, determining that the authorization file is valid.

In some embodiments, in determining whether the pre-installed application is the user-level application if the authorization file is valid, the processor 20 calls the computer program to implement the steps of:

if the authorization file is valid, scanning the user-level application directory and determining whether the installation package of the pre-installed application is in the user-level application directory; and if the installation package of the pre-installed application is in the user-level application directory, determining that the pre-installed application is the user-level application.

In some embodiments, after the pre-installed application is uninstalled, the processor 20 calls the computer program to implement the step of:

archiving the installation package of the pre-installed application to an uninstalled user-level application file.

In some embodiments, before the pre-installed application is uninstalled, the processor 20 calls the computer program to implement the step of:

determining whether the installation package of the pre-installed application is in the uninstalled user-level application file; and if the installation package of the pre-installed application is not in the uninstalled user-level application file, uninstalling the pre-installed application.

The mobile terminal of the present embodiment may include, but is not limited to, the memory 10 and the processor 20. A person skilled in the art understands that FIG. 3 only shows an example of the mobile terminal, the mobile terminal shown in FIG. 3 does not constitute a limitation to the mobile terminal, and may include more or less components than those illustrated in the drawings. Furthermore, some components of the mobile terminal can be combined and/or arranged in different ways other than that shown in FIG. 3.

The memory 10 can be an internal storage unit of the mobile terminal, such as a hard disk or a memory of the mobile terminal. The memory 10 may also be an external storage device of the mobile terminal, such as a plug-in hard disk, a Smart Media Card (SMC), a Secure Digital (SD) and a Flash Card that are equipped in the mobile terminal.

The memory 10 may also include both an internal storage unit and an external storage device of the mobile terminal. The memory 10 is used to store the computer program and other programs and data required by the mobile terminal. The memory 10 can also be used to temporarily store data that has been output or will be output.

The processor 20 may be a Central Processing Unit (CPU), and may also be other general-purpose processor, Digital Signal Processor (DSP), Application Specific Integrated Circuit (ASIC), Field Programmable Gate Array (FPGA), or other programmable logic device, discrete gate or transistor logic device, discrete hardware component, etc. The general-purpose processor may be a microprocessor or the processor may also be any conventional processor, or the like.

Above descriptions are specific embodiments of the present application. It should be noted that various modifications and alterations can be made by persons skilled in this art without departing from the principles of the present application, and that all modifications and alterations are within the scope of the present application.

What is claimed is:

1. A method for uninstalling a pre-installed application in a mobile terminal, comprising the steps of:

obtaining an authorization file for uninstalling the pre-installed application;

determining whether the authorization file is valid;

in response to a determination that the authorization file is valid, determining whether the pre-installed application is a user-level application; and in response to a determination that the pre-installed application is the user-level application, uninstalling the pre-installed application, wherein the authorization file comprises a configuration file and a signature file, and the step of obtaining the authorization file for uninstalling the pre-installed application comprises:

obtaining configuration parameters of the mobile terminal;

generating the configuration file based on the configuration parameters;

obtaining abstract information of the configuration file; and encrypting the abstract information of the configuration file to obtain the signature file, wherein the step of determining whether the authorization file is valid comprises:

determining whether the configuration file and the signature file exist:

in response to a determination that the configuration file and the signature file exist, obtaining the abstract information of the configuration file and decrypting the signature file to obtain the abstract information of the signature file, determining whether the abstract information of the configuration file is the same as the abstract information of the signature file;

in response to a determination that the abstract information of the configuration file is the same as the abstract information of the signature file, obtaining identifier information of the configuration file;

determining whether the identifier information of the configuration file is the same as the identifier information of the mobile terminal: and in response to a determination that the identifier information of the configuration file is the same as the identifier information of the mobile terminal, determining that the authorization file is valid, wherein the configuration parameters at least comprise International Mobile Equipment Identity (IMEI), Serial Number (SN) and model number of the mobile terminal.

2. The uninstalling method according to claim 1, further comprising:

before the step of obtaining the authorization file for uninstalling the pre-installed application, adding a user-level application directory in a storage space of the mobile terminal, and storing an installation package of the pre-installed application of the mobile terminal in the user-level application directory.

3. The uninstalling method according to claim 2, wherein the step of determining whether the pre-installed application is the user-level application if the authorization file is valid comprises:
   in response to a determination that the authorization file is valid, scanning the user-level application directory and determining whether the installation package of the pre-installed application is in the user-level application directory; and
   in response to a determination that the installation package of the pre-installed application is in the user-level application directory, determining that the pre-installed application is the user-level application.

4. The uninstalling method according to claim 3, further comprising:
   after the pre-installed application is uninstalled, archiving the installation package of the pre-installed application to an uninstalled user-level application file.

5. The uninstalling method according to claim 4, further comprising:
   before the pre-installed application is uninstalled, determining whether the installation package of the pre-installed application is in the uninstalled user-level application file; and
   in response to a determination that the installation package of the pre-installed application is not in the uninstalled user-level application file, uninstalling the pre-installed application.

6. A memory, storing a computer program that is executable to implement the following method steps:
   obtaining an authorization file for uninstalling the pre-installed application;
   determining whether the authorization file is valid;
   in response to a determination that the authorization file is valid, determining whether the pre-installed application is a user-level application; and
   in response to a determination that the pre-installed application is the user-level application, uninstalling the pre-installed application,
   wherein the authorization file comprises a configuration file and a signature file, and in obtaining the authorization file for uninstalling the pre-installed application, the computer program is executed to implement the steps of:
   obtaining configuration parameters of the mobile terminal;
   generating the configuration file based on the configuration parameters;
   obtaining abstract information of the configuration file; and
   encrypting the abstract information of the configuration file to obtain the signature file,
   wherein in determining whether the authorization file is valid, the computer program is executed to implement the steps of:
   determining whether the configuration file and the signature file exist;
   in response to a determination that the configuration file and the signature file exist, obtaining the abstract information of the configuration file and decrypting the signature file to obtain the abstract information of the signature file;
   determining whether the abstract information of the configuration file is the same as the abstract information of the signature file;
   in response to a determination that the abstract information of the configuration file is the same as the abstract information of the signature file, obtaining identifier information of the configuration file;
   determining whether the identifier information of the configuration file is the same as the identifier information of the mobile terminal; and
   in response to a determination that the identifier information of the configuration file is the same as the identifier information of the mobile terminal, determining that the authorization file is valid,
   wherein the configuration parameters at least comprise International Mobile Equipment Identity (IMEI), Serial Number (SN) and model number of the mobile terminal.

7. The memory according to claim 6, wherein before obtaining the authorization file for uninstalling the pre-installed application, the computer program is executed to implement the step of:
   adding a user-level application directory in a storage space of the mobile terminal, and storing an installation package of the pre-installed application of the mobile terminal in the user-level application directory.

8. The memory according to claim 7, wherein in determining whether the pre-installed application is the user-level application if the authorization file is valid, the computer program is executed to implement the steps of:
   in response to a determination that the authorization file is valid, scanning the user-level application directory and determining whether the installation package of the pre-installed application is in the user-level application directory; and
   in response to a determination that the installation package of the pre-installed application is in the user-level application directory, determining that the pre-installed application is the user-level application.

9. The memory according to claim 6, wherein after the pre-installed application is uninstalled, the computer program is executed to implement the step of:
   archiving the installation package of the pre-installed application to an uninstalled user-level application file.

10. The memory according to claim 9, wherein before the pre-installed application is uninstalled, the computer program is executed to implement the steps of:
   determining whether the installation package of the pre-installed application is in the uninstalled user-level application file; and
   in response to a determination that the installation package of the pre-installed application is not in the uninstalled user-level application file, uninstalling the pre-installed application.

11. A mobile terminal, comprising a processor and a memory communicating with the processor, the memory storing a computer program, the processor configured to call the computer program in the memory to implement the following method steps:
   adding a user-level application directory in a storage space of the mobile terminal, and storing an installation package of the pre-installed application of the mobile terminal in the user-level application directory;
   obtaining an authorization file for uninstalling the pre-installed application, wherein the authorization file comprises a configuration file and a signature file;
   determining whether the authorization file is valid;
   in response to a determination that the authorization file is valid, determining whether the pre-installed application is a user-level application; and in response to a determination that the pre-installed application is the user-level application, uninstalling the pre-installed application, wherein in obtaining the authorization file for uninstalling the pre-installed application, the processor calls the computer program to implement the steps of:

obtaining configuration parameters of the mobile terminal;

generating the configuration file based on the configuration parameters;

obtaining abstract information of the configuration file; and encrypting the abstract information of the configuration file to obtain the signature file, wherein in determining whether the authorization file is valid, the processor calls the computer program to implement the steps of:

restarting the mobile terminal:

determining whether the configuration file and the signature file exist;

in response to a determination that the configuration file and the signature file exist, obtaining the abstract information of the configuration file and decrypting the signature file to obtain the abstract information of the signature file;

determining whether the abstract information of the configuration file is the same as the abstract information of the signature file;

in response to a determination that the abstract information of the configuration file is the same as the abstract information of the signature file, obtaining identifier information of the configuration file;

determining whether the identifier information of the configuration file is the same as the identifier information of the mobile terminal: and in response to a determination that the identifier information of the configuration file is the same as the identifier information of the mobile terminal, determining that the authorization file is valid, wherein the configuration parameters at least comprise International Mobile Equipment Identity (IMEI), Serial Number (SN) and model number of the mobile terminal.

12. The mobile terminal according to claim 11, wherein in determining whether the pre-installed application is the user-level application if the authorization file is valid, the processor calls the computer program to implement the steps of:

in response to a determination that the authorization file is valid, scanning the user-level application directory and determining whether the installation package of the pre-installed application is in the user-level application directory; and in response to a determination that the installation package of the pre-installed application is in the user-level application directory, determining that the pre-installed application is the user-level application.

13. The mobile terminal according to claim 12, wherein the processor calls the computer program to implement the step of:

after the pre-installed application is uninstalled, archiving the installation package of the pre-installed application to an uninstalled user-level application file.

\* \* \* \* \*